United States Patent [19]
Allen et al.

[11] Patent Number: 4,465,259
[45] Date of Patent: Aug. 14, 1984

[54] CONTROL VALVE

[76] Inventors: Richard J. Allen, Warwick, R.I.; Raymond B. Allen, heir; Alma L. Allen, heir, both of 32 La. 8 Gaspee Point, Warwick, R.I. 02888

[21] Appl. No.: 313,801

[22] Filed: Oct. 22, 1981

Related U.S. Application Data

[63] Continuation-in-part of Ser. No. 244,031, Mar. 16, 1981, abandoned, which is a continuation-in-part of Ser. No. 145,041, Apr. 30, 1980, abandoned, which is a continuation-in-part of Ser. No. 943,043, Sep. 18, 1978, abandoned.

[51] Int. Cl.³ .............................................. F16K 5/06
[52] U.S. Cl. .................................. 251/304; 137/875; 137/876; 137/625.46; 251/306; 251/315
[58] Field of Search .................. 137/875, 876, 625.41, 137/625.44, 625.46; 251/298, 304, 306, 315

[56] References Cited

U.S. PATENT DOCUMENTS

| | | | |
|---|---|---|---|
| 713,466 | 11/1902 | Louis | 137/876 |
| 1,553,953 | 9/1925 | O'Brien | 137/875 |
| 2,494,091 | 1/1950 | Harris | 251/367 X |
| 2,720,214 | 10/1955 | Rupp et al. | 137/875 X |
| 3,176,720 | 4/1965 | Donahue | 137/625.44 |
| 3,697,043 | 10/1972 | Baker | 251/315 |
| 3,727,879 | 4/1973 | Lange et al. | 251/84 |
| 3,770,241 | 11/1973 | Allen | 251/76 |
| 4,253,485 | 3/1981 | Legille | 251/298 X |

FOREIGN PATENT DOCUMENTS

| | | | |
|---|---|---|---|
| 1234106 | 2/1967 | Fed. Rep. of Germany | 251/304 |
| 1919865 | 10/1969 | Fed. Rep. of Germany | 251/315 |
| 1675545 | 1/1973 | Fed. Rep. of Germany | 251/315 |
| 958836 | 3/1950 | France | 137/625.46 |
| 973079 | 10/1964 | United Kingdom | 251/304 |

Primary Examiner—Gerald A. Michalsky
Attorney, Agent, or Firm—Barlow & Barlow, Ltd.

[57] ABSTRACT

A control valve having a through flow path with a closure member providing a substantially unhindered flow through the valve when in open position but closing the path substantially at right angles to the axis of flow when in closed position. A stem controls the unit closure member and is located at an acute angle to the flow path and also to the closure position of the closure member in such a manner that a multiplication of the force applied is provided by means of its geometric relation. The casing in which the closure member is located is in two parts and separable in such a way that the closure member may be easily removed and replaced by a closure member of a different shape.

7 Claims, 16 Drawing Figures

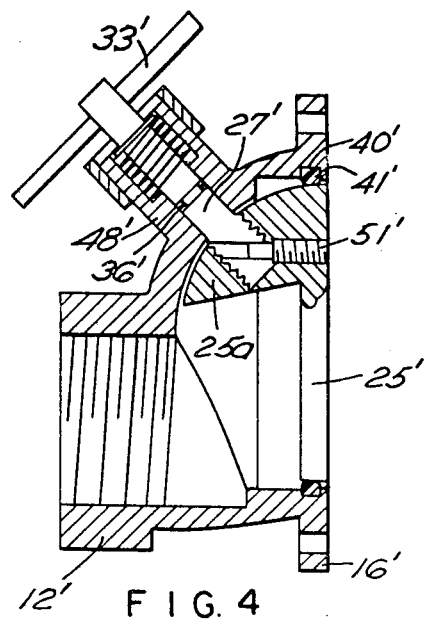
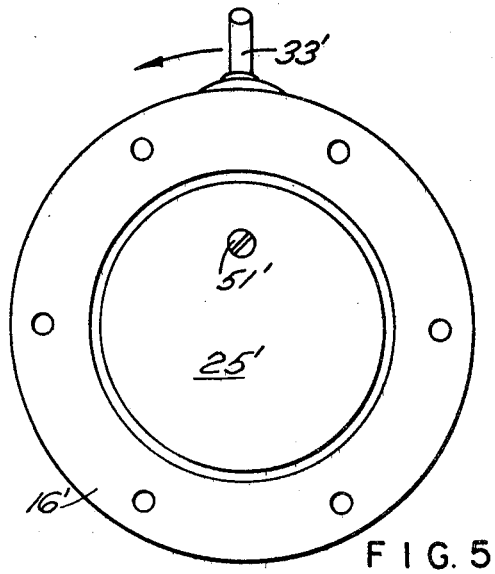
FIG. 4
FIG. 5
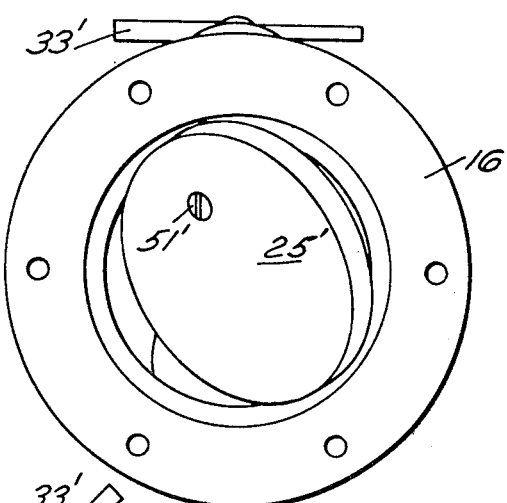
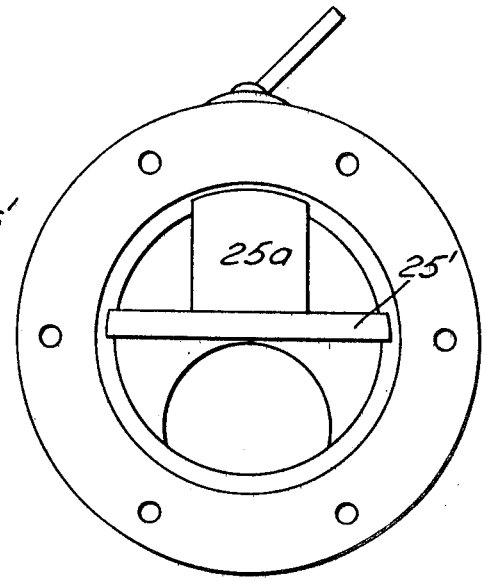
FIG. 6
FIG. 7
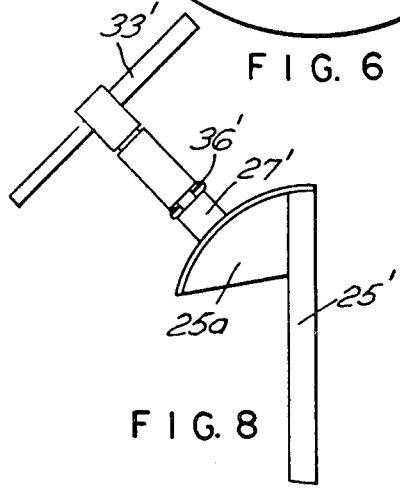
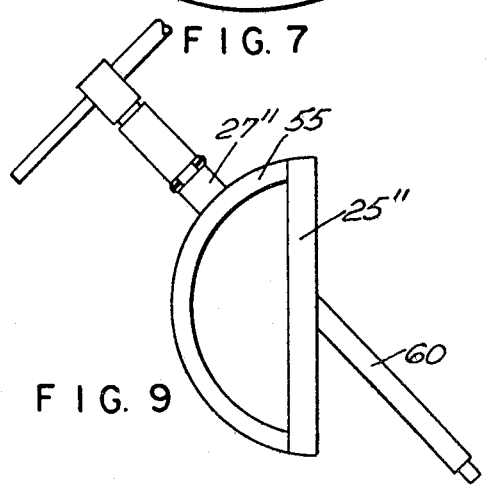
FIG. 8
FIG. 9

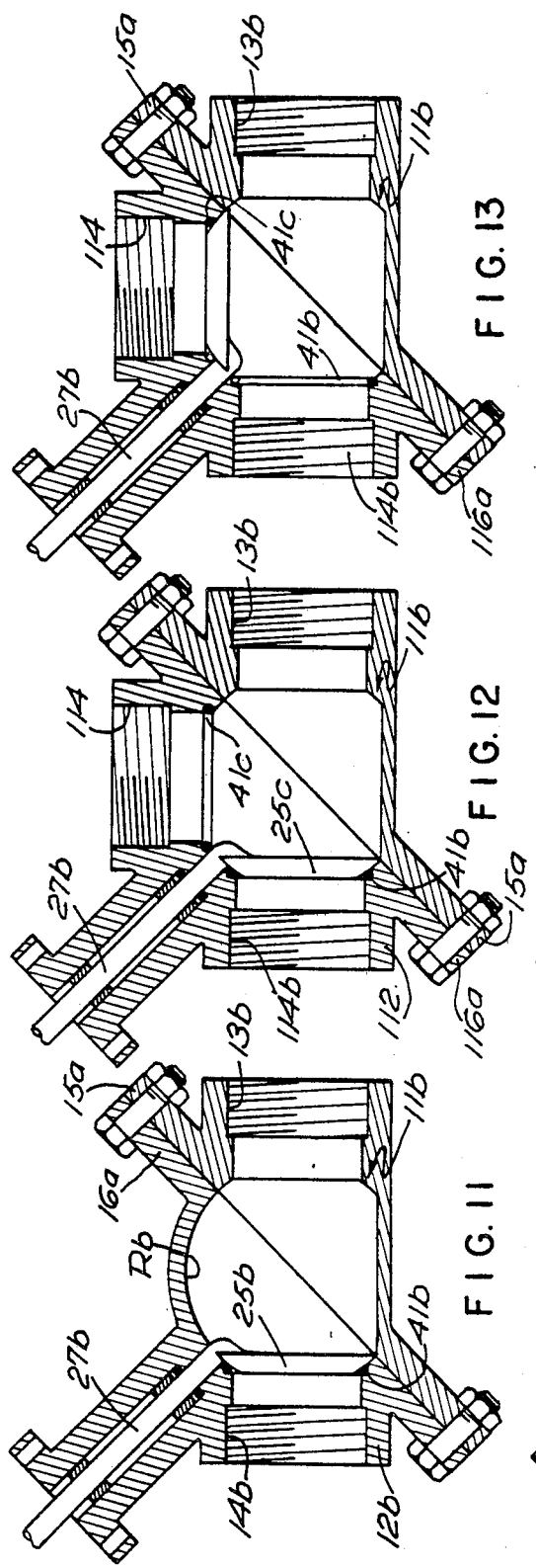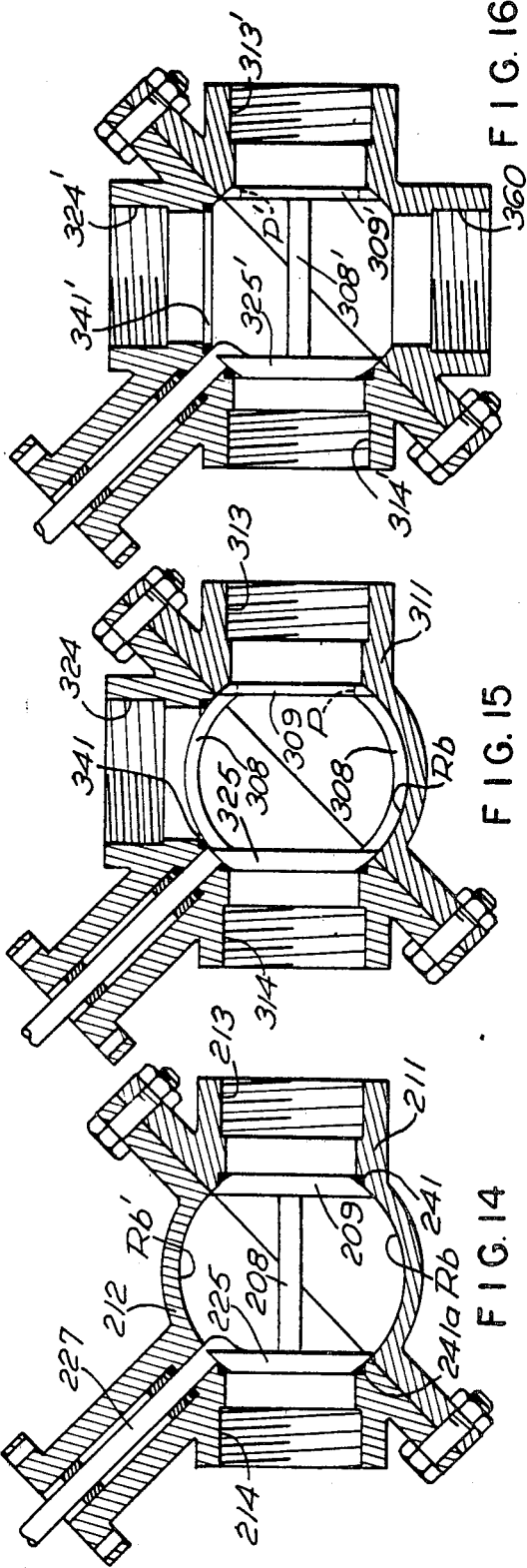

CONTROL VALVE

CROSS REFERENCE TO RELATED APPLICATIONS

This application is a continuation-in-part of my earlier filed application Ser. No. 244,031, filed Mar. 16, 1981 (now abandoned), which was a continuation-in-part application of my application Ser. No. 145,041, filed Apr. 30, 1980 (now abandoned), which was a continuation-in-part application of my application Ser. No. 943,043 filed Sept. 18, 1978 (now abandoned).

BACKGROUND OF THE INVENTION

Control valves having a through passage and a closure member operably by a stem at an angle to the passage and also at an angle to the closed position of the closure member have been known in my earlier U.S. Pat. No. 3,770,241 and also in a U.S. Pat. No. 3,727,879. In the latter patent the sealing portion of the closure member is subject to the high pressure side of the fluid controlled tending to open under the pressure and pass the fluid controlled. Additionally, in German patent specification No. 1,234,106 there is shown a control valve with a valve member that moves from an inline flow position to a closed position. In the open position, however, the closure vane is in the flow path, all of which is in distinction to a valve in which a complete through passage from the inlet to the outlet port is provided when the closure member is in the fully opened position.

SUMMARY OF THE INVENTION

A control valve having a casing with a through passage in which is located a closure member which is swingable about an axis at the periphery of the passage and also through an angle to the axial line of the passage through the casing, the closure member being swingable about this axis also to closure position where it is pressed by the high pressure side of the valve against a seat so that as the pressure is increased the pressure of the closure member on the seat is increased. The angular relation of the stem for moving the closure member is such that a multiplication by this geometric relation is provided and when the angulation is 45° to the axis of the flow stream and also the pressure face of the valve, there being a substantially 2 to 1 increase in force for movement of the closure member. The casing is also separable in two pieces substantially along a plane parallel to the sealing seat so that when the two pieces of casing are separated, the closure member may be withdrawn and replaced by a closure member of a different configuration.

BRIEF DESCRIPTION OF THE DRAWINGS

FIG. 4 is a view of a modified closure member shown in the fully closed position, the righthand portion of the complete valve structure being eliminated for clarity;

FIG. 5 is an end elevational view taken from the righthand side of FIG. 4;

FIGS. 6 and 7 are views similar to FIG. 5 showing the closure member in two different positions partially open and fully open, illustrating the manner in which the ports are completely uncovered;

FIG. 8 is a side elevational view of the closure member as seen in FIGS. 4 thru 7;

FIG. 9 is a slightly modified view of an alternate form of closure member with an additional strengthening structure therein;

FIG. 11 is a sectional view of an in-line butterfly valve in which the butterfly retracts in accordance with the invention out of the passageway.

FIGS. 12 and 13 are cross-sectional views of a three-way butterfly control valve in alternate positions;

FIG. 14 is a sectional view of an in-line butterfly valve with a double closure for bi-directional flow; and FIGS. 15 and 16 are sectional views of a supported butterfly disc in three-way and diverter configurations.

Figure 1:
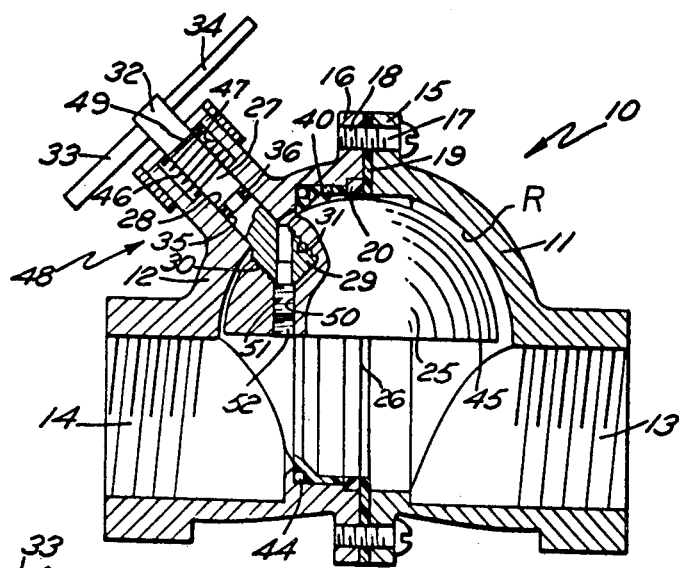
FIG. 1 is a sectional view of the two parts of the casing in assembled position and showing the closure member in wide open position for a flow of fluid through the casing.

DESCRIPTION OF THE PREFERRED EMBODIMENTS 10 designates a control valve having a casing in two parts, the high pressure or upstream part or side being designated 11 and the low pressure or downstream part or side 12. In assembled position, this casing has the entrance port at 13 for the high pressure side of liquid to flow through the casing and at 14 the exit port for the fluid which passes through the casing as shown in FIG. 1. The entrace and exit are conveniently shown internally threaded for piping connection. The two parts of the casing 11 and 12 each have flanges 15 and 16 with registering holes for the passage of screw fasteners 17 through these holes, the hole in part 15 being smooth which the hole in part 16 is threaded as at 18 to receive the threads of the screw 17. Gaskets of some soft material such as "Teflon" may be placed between the flanges of the casing, one gasket 20 entering the recess 21 of the casing 12 and one gasket 19 between the flanges and engaging gasket 20.

Figure 2:
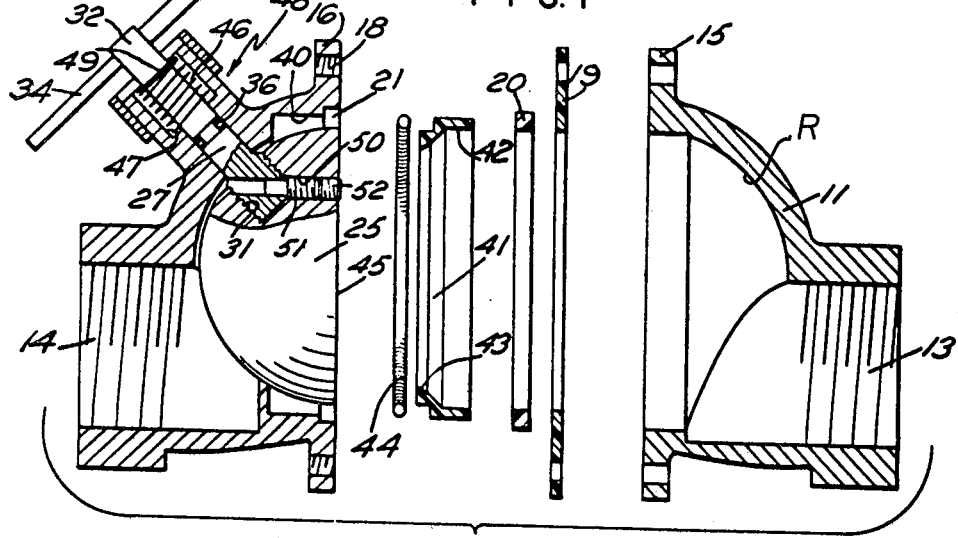
FIG. 2 is an exploded view showing the two pieces of the casing separated and with the closure member moved through 90° from that shown in FIG. 1 to a closed position where it may be pressed against the sealing seat by the high pressure side of the liquid passing through the casing.
Figure 3:
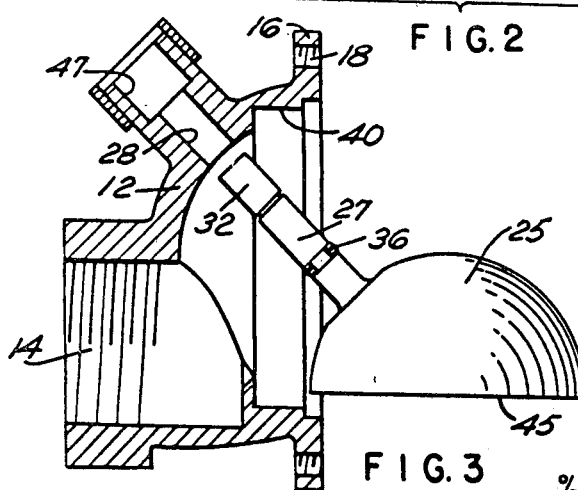
FIG. 3 is a view similar to FIG. 2 of the part of the casing containing the closure member and showing the closure member as partly removed from this casing.

When closure member 25, which in the embodiment of FIGS. 1 to 3 is shown as hemispherical, is in the open position, it is entirely located in a portion of the casing lying outside the flow path between the ports illustrated as a bulbous portion of the assembled casing or a recess R in the passageway. This member 25 has a flat surface with a center on a pivotal point 26 which is substantially the peripheral line of the thru passage 13 and 14 of the casing. A stem 27 is journalled in a bearing 28 which has its center axis intersecting the center point 26 of the closure member 25. This stem 27 is enlarged somewhat as at 29 and threaded as at 30 to be screw threaded into a recess 31 in the closure member 25. To hold the valve stem seated in the closure member, the flat surface 45 of the hemispherical control member is provided with a bore 50 which intersects the threaded portion 30 of the stem and into this bore 50 there is threaded a member 51 which bears against the threads of the stem followed by a locking member 52 and prevents the stem from turning to release it from the control member.

The stem has a portion 32 extending outwardly from the casing to receive a manipulating handle having a heavy portion 33 and a smaller portion 34 which may pass through the upper end 32 of the stem. Also this stem is recessed as at 35 and receives the O-ring 36 to prevent passage of liquid along its journal. The part 12 of the casing adjacent flange 16 is recessed as at 40 and receives a seat of a non metallic material such as PTFE or "Teflon" or a metallic seat designated generally 41 (see FIG. 2). This seat is generally cup shape with a flange 42 which merges into an inclined portion 43 against which the tapered arcuate surface of the spherical control member 25 may press as seen in FIG. 2. Some resilient material such as a helically coiled spring 44 backs up this seat tending to keep the inclined portion 43 always pressed toward the closure member 25 to receive the pressure of the control member 25 which in the closed position, shown in FIG. 2, has its flat surface 45 subject to the high pressure side of the liquid passing through the valve. The inner lip of gasket 19 may engage the cup seat to hold it in position. Also there is a spring 46 in a recess 47 of the neck surrounding the outer end of the valve stem which presses against the bottom of this cup and against a spring retainer 49 in a groove in the stem tending to move the closure member outwardly against its seat 43.

The closure member 25, however, may be removed easily by separating the casing as shown in FIG. 2 turning the closure member 25 to substantially the position shown in FIG. 3 removing the spring 46 and handles 33, 34 and withdrawing the stem 27 from the part of the casing 12. The O-ring 36 will slide out with a stem as the closure member 25 is withdrawn.

Referring now to FIGS. 4 thru 9, there is illustrated a slightly modified form of control valve in which the closure member rather than being hemispherical is, in actuality, a single vane to which the operator is attached. As in the previous embodiment, the casing is in two parts, there being seen in these figures merely the downstream part 12′ which has a flange 16′ with a recess 40′ that receives a sealing gasket member 41′. The closure member 25′ is essentially a flat disc with an integral boss 25a into which there is received in any suitable manner as, for example, by threading an operating stem 27′. For example, the stem may be retained in the boss by a pin and set screw arrangement 51′. The stem 27′ is sealed to the bore in the neck 48′ by an O-ring 36′ and the outer end of the control stem is provided with a handle 33′, it being understood that mechanical operators can be coupled to the stem, the manual operator being shown purely by way of illustration.

In FIG. 9 of the drawings there is shown a slightly modified form of butterfly closure in which the flat butterfly closure member 25″ has affixed to the back surface thereof a hemispherical bridge 55 to which the operating stem 27″ is affixed. In all other respects the closure member is similar to the closure member illustrated in FIG. 8 of the drawings.

In operation, assuming the valve to be in open position as shown in FIG. 1, in order to move the valve to closed position, such as shown in FIG. 2, the stem 27 will be rotated through 180° which will move the closure member 25 through an angle of 90° by reason of the angular arrangement of the stem with respect to the closure member and its thru passage, thus giving a 2 to 1 movement of the handle 33, 34 and a multiplication of 2 to 1 of the force applied to the stem by this arrangement. The leverage may also be multiplied by extending the lengths of the handle 33, 34. This provides a very low torque arrangement which is the case of the angularity of 45° as shown is 2 to 1 but which may be varied by varying the angularity of the axis of the stem with relation to the open and closed position of the closure member and it is of course apparent that the closure member may be located in intermediate positions between open and closed.

Figure 10:
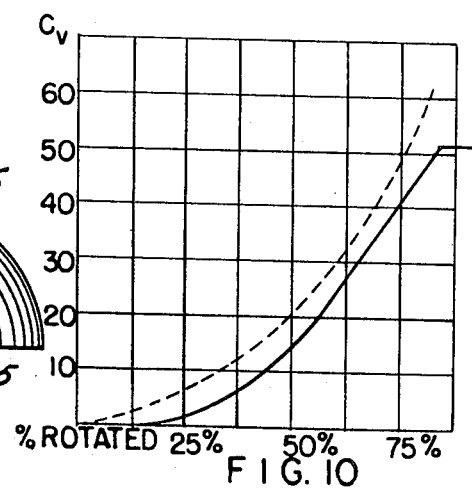
FIG. 10 is a graphical representation of a characteristic of valve operation.

With a valve of the configuration described above, a number of desirable features are attained. Generally, when comparing valves one is interested in the flow characteristic $C_v$ which expression is defined as the ratio of flow in gallon per minute divided by the square root of the differential pressure over the specific gravity of water for the fluid which is passing thru the valve. The operating torque of the valve of the instant invention is very low, and results in a dynamic torque that is considerably lower than conventional butterfly valves. As seen in FIG. 10 of the drawing, there is plotted $C_v$ against percent opening, the broken line indicating a standard butterfly disc, while the solid line indicates direct test results. It will also be noted that once the valve of the instant invention has been rotated to approximately 80% open or an actual rotation of the valve stem of 150° that the liquid flow characteristic coefficient becomes uniform, the disc at this point lying substantially within the recess R.

Another interesting feature of the present invention is the interchangeability of the valve closure members, the butterfly valve closure member being readily interchangeable with the hemispherical closure member, all within the same casing. Additionally, the valve design lends itself to a number of modifications as, for example, in certain situations, it is preferable to provide additional support as one would in a ball valve, by adding a supplemental stem such as a stem 60 (see FIG. 9) that would provide the additional support necessary in large structures so that there would not be the problem of excessive bending moment being exerted on the short stem, to which the operator is attached. It will be understood that while the stem 60 is shown in connection with the structure in FIG. 9, that it may be utilized in the other constructions such as in FIGS. 1 to 3 and 8.

Referring to FIG. 11 there is shown therein a modified form of a butterfly type control valve where there are two casing parts as in the previous embodiment, but in this case the two casing parts are separable along a parting line that is at an angle to the flow path or cylindrical passage between the inlet 13b and the outlet 14b, the high pressure or upstream part being generally designated 11b, while the downstream part is generally designated 12b. The closure member 25b is formed in the same fashion as the closure member seen in FIG. 8 of the drawings and can be readily rotated between the closed position as seen in the drawings where it engages a suitable seal 14b to the open position within recess Rb. By utilizing this general configuration, the variation of FIGS. 12 and 13 are possible where a three-way valve has been illustrated in which the downstream section designated 112 is formed with two downstream outlets 114 and 114b which extend substantially at right angles to each other, each having sealing means 41c, 41b respectively. It will also be noted that the upstream part of the casing is identical to the upstream part of the casing as shown in FIG. 11, which is achieved by utilizing the same concept of having flanges such as 15a thereon that mate with flanges 116a. Also it will be apparent that if section 12b were substituted for section 112, an angle valve is created. Alternately, port 114b may be suitably stoppered.

Referring now to FIG. 14 it will be noted that in effect, this is an adaptation of the illustrated form in FIG. 11 in which provision has been made for sealing for bi-directional flow. To this end the housing parts 211 and 212 are both provided with porting 213 and 214 that are fitted at the inner ends thereof with sealing means 241 and 241a. As in the previous embodiments, an operating stem 227 is secured to a disc 225 which by a pair of arcuate members 208 is connected to a second disc 209. The spacing of the discs is such that seating of each may be had against sealing means 241.

It will be apparent from examining the drawing that a pair of recesses Rb and Rb' are provided in the casings 211 and 212 respectively, so that by following the action as in the previous embodiments as the stem 227 is rotated, the discs in turn will be rotated into the recesses, giving full through flow from port to port. In addition, because of the particular structure of the embodiment disclosed herein, flow may be controlled in either direction and the opening and closing of the valve automatically will scavenge the recesses Rb of any foreign matter that perchance has accummulated therein due to the fluid that may be flowing through the valve.

Referring now to FIG. 15 there is shown a particular form of a diverter valve in which the butterfly disc 325 is connected by a pair of arcuate members 308 to a non-sealing ring 309, which results in a thru port indicated by the letter P. In reality, the ring 309 serves as a support means for the main disc 325 in large valve structures where there might be in existance an excessive drop in pressure and in order to keep the thickness of the disc at a minimum, the additional arcuate members and ring will provide rigidity and support so that when the disc is rotated to the alternate position where it will close port 324, the arcuate members and the ring structure will support the disc 325 against the sealing means 341. In this way also the ring 309 serves as a cleaning device for the valve when the disc is rotated to the alternate position, the ring will sweep through the recess Rb which exists in the body portion 311.

Referring to FIG. 16 a version similar to the version illustrated in FIG. 15 has been shown, but in this case a diverter four port valve has been illustrated utilizing the same structure as shown in FIG. 15 and to this end, the parts have all been designated with a prime. The main distinction here is in the addition of another port 360 which will allow the valve to effectively have the function of flow entering port 313' and flowing out of ports 324' and 360' as illustrated in the drawing. When the disc 325 is rotated, then flow that would be entering port 313' will now exit through ports 314' and 360'. In all other respects this particular construction is identical to the constructions illustrated more particularly in FIGS. 12 and 13.

I claim:

1. A control valve comprising a casing having a cylindrical passage therethrough, a casing portion lying outside the said passage to create a recess in the passage to receive a closure member, a valve seat within said passage and casing portion having an axial center at substantially the periphery of said cylindrical passage, said seat lying on an axis at right angles to said passage, a stem rotatably journalled in said casing through at least a part of said casing portion and having an axis intersecting at an acute angle at least a portion of the axis of said cylindrical passage, a closure member of a size to engage said valve seat and presenting a pressure face to at least the upstream side of the cylindrical passage above the valve seat and a back face to the downstream side of the passage below the valve seat whereby the pressure of the fluid on the upstream side of the passage forces the closure member onto its seat in closed position, said closure member on the downstream side receiving said stem and locked thereto to rotate with said stem from a closed position on said valve seat to an open position with its pressure face substantially parallel to at least a portion of the axis of said through passage and located in said recess.

2. A control valve as in claim 1 wherein said pressure face is flat.

3. A control valve as in claim 1 wherein said closure member is hemispherical.

4. A control valve as in claim 1 wherein said closure member has an inclined edge to engage said seat.

5. A control valve as in claim 1 wherein said acute angle is 45°.

6. A control valve as in claim 1 wherein said casing is in two pieces held together and separable along a plane generally parallel to said seat and the pressure face of said closure member in closed position, said closure member and its stem being journalled in one part of said casing and slidable from its journal for substitution of another closure member.

7. A control valve as in claim 6 wherein the journal for said stem is in the casing piece in which the valve seat is located.

* * * * *